United States Patent [19]

Roeschlaub et al.

[11] 4,276,155

[45] Jun. 30, 1981

[54] METHOD FOR RECYCLING THE WATER USED IN A PROCESS FOR RECOVERING GLASS FROM MUNICIPAL WASTE

[75] Inventors: John G. Roeschlaub, Upland; Ivan J. Hopkins, Pomona, both of Calif.

[73] Assignee: Occidental Petroleum Corporation, Los Angeles, Calif.

[21] Appl. No.: 849,063

[22] Filed: Nov. 7, 1977

[51] Int. Cl.[3] ............ B03B 7/00

[52] U.S. Cl. ............ 209/10; 209/12; 209/166

[58] Field of Search ............ 209/166, 3, 12, 1, 10; 210/44

[56] References Cited

U.S. PATENT DOCUMENTS

| | | | |
|---|---|---|---|
| 3,252,662 | 5/1966 | Lyons | 209/166 X |
| 3,419,493 | 12/1968 | Pangle | 210/44 |
| 4,070,273 | 1/1978 | Morey | 209/166 X |

FOREIGN PATENT DOCUMENTS

| | | | |
|---|---|---|---|
| 2098248 | 10/1972 | France | 209/166 |

OTHER PUBLICATIONS

Deco Trefoil, Spring Issue, 1970, Bull. No. M4-B139, 9-16.

Proc. of the Third Min. Waste Utilization Symposium, Mar. 1972, 311-321, Morey et al.

*Primary Examiner*—Robert Halper

[57] ABSTRACT

A process for efficiently recycling the water used in the various stages of a process for recovering glass from municipal trash. The invention comprises the separate treatment and recycling of the process water resulting from the first step separation of the incoming trash into a glass and inorganic constituent and an organic constituent for reuse in that step; the separate treatment and recycling of the process water emanating from the second step size classification to either the first or second steps; and, the treatment and recycling of the process water used in the froth flotation separation of the glass from the other inorganic constituents to any of the three steps in the process.

23 Claims, 1 Drawing Figure

PREDOMINANTLY INORGANIC FRACTION
PREDOMINANTLY ORGANIC FRACTION
RECYCLED WATER
ORGANIC MATERIALS
TO LANDFILL
RECYCLED WATER
GLASS
FROTH FLOATATION CELLS
AIR
TAILINGS
RECYCLED WATER
RECYCLED WATER
SLIMES

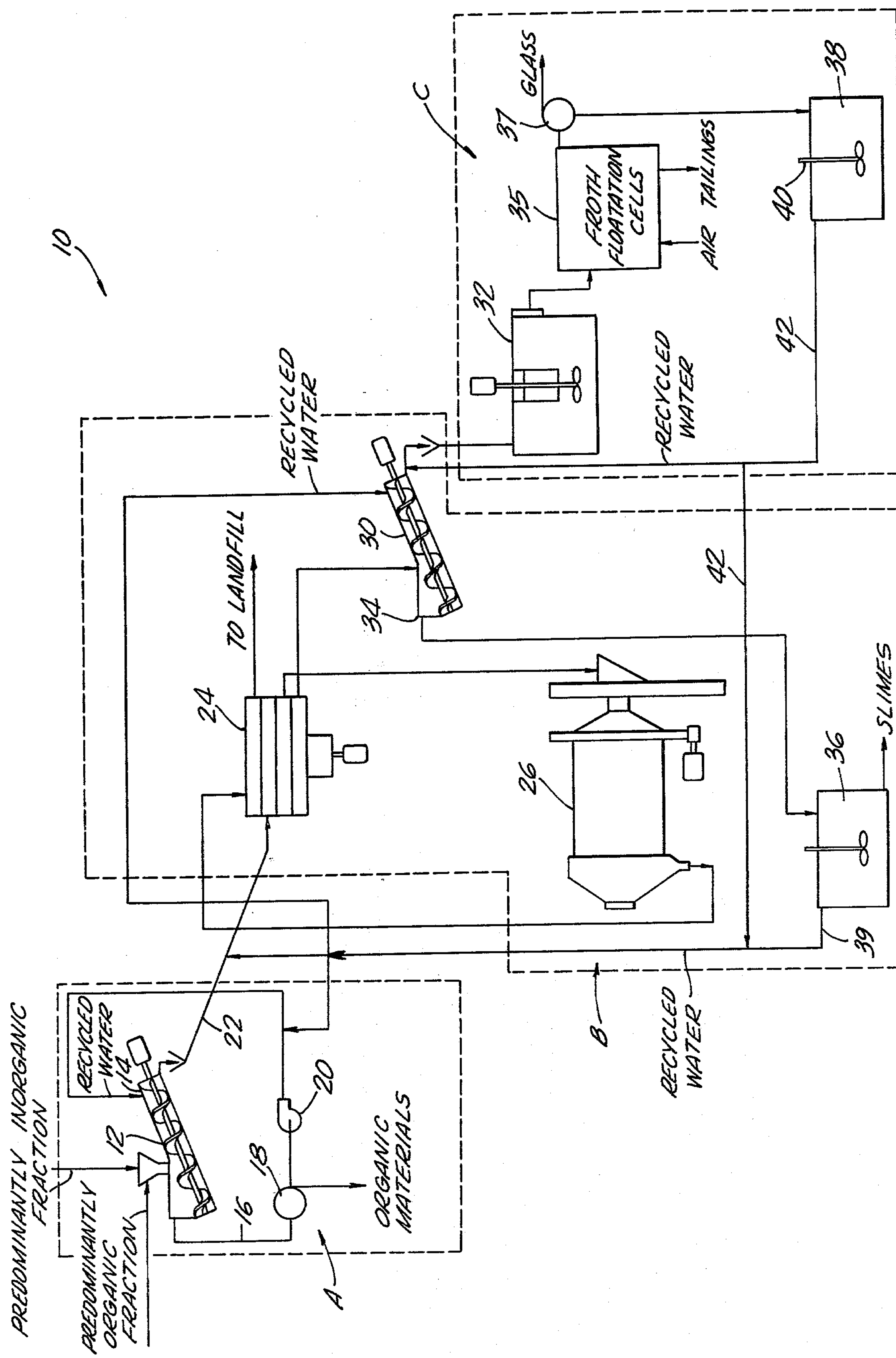
10
PREDOMINANTLY INORGANIC FRACTION
PREDOMINANTLY ORGANIC FRACTION
RECYCLED WATER
ORGANIC MATERIALS
TO LANDFILL
SLIMES
GLASS
FROTH FLOATATION CELLS
TAILINGS
AIR
A
B
C

METHOD FOR RECYCLING THE WATER USED IN A PROCESS FOR RECOVERING GLASS FROM MUNICIPAL WASTE

BACKGROUND OF THE INVENTION

Several processes have been disclosed in the prior art for the economical recovery of relatively pure, recyclable glass from municipal trash. Notable examples include U.S. Pat. Nos. 3,650,896; 3,720,380; 3,817,458; application for United States Letters Patent Ser. No. 603,868 filed Aug. 11, 1975; and the article "Glass Recovery From Municipal Trash By Froth Flotation" by Morey et al published in the *Proceedings of the Third Mineral Waste Utilization Symposium.*

These processes are generally part of an overall system for the treatment of solid waste for recovery and recycle back to the economy of useful values in the waste. The systems usually involve separating organic materials from the inorganic metals, concrete, bricks, and glass, etc. and then further segregating and enriching the individual constituents. The predominantly organic fraction is further segregated to recover saleable materials such as paper pulp and the remainer is either pyrolysized to form char and an economically valuable gaseous stream, or otherwise treated to form a solid fuel, compost, or landfill. The predominantly inorganic fraction is further treated to segregate the ferrous metals, non-ferrous conductive metals, and glass.

An exemplary glass recovery process involves three steps: (1) passing the glass-rich fraction to a first classification zone, such as a screw classifier or jig concentrator, to remove any remaining organic constituents; (2) a second step of size classification, such as by screening or a spiral classifier, preferably in conjunction with the commminution to obtain a preselected size distribution of the organic-free glass; and, (3) froth flotation to separate the glass from the other inorganic tailings. Processes of this type use a considerable amount of water. For example, the process described in application for United States Letters Patent Ser. No. 603,868 utilizes approximately 10,000 gallons of water to recover each ton of glass. Heretofore, this water, after use in the various aspects of the process, was discharged to the sewer. This is because the several attempts that have been made to centrally treat the water used in the process, to thereby place it in condition for reuse, have either been more expensive per gallon of fresh water or, for the most part unsuccessful in removing deleterious impurities from the water for reuse in all parts of the process. In the past an abundance of water at low cost more than excused this inefficiency. However, in light of recent shortfalls in supply, and ever increasing population and industrial demands on water such inefficiency can no longer be sanctioned.

SUMMARY OF THE INVENTION

The present invention addresses itself to this problem; more particularly, the present invention comprises a method for efficiently and effectively recovering, for reuse, a substantial portion of the water used in recycling glass from municipal waste. As will be more fully described hereinafter, the invention herein is a recognition of the fact that the impurities absorbed by the water used in each step of the glass recovery process are deleterious only to those steps which are downstream in the process. That is, if the water discharged from a particular step in the glass recovery process is recycled back to that step or other steps upstream from that step, it may be reused with only relatively simple purification/-clarification. It is only when the process water of one step is reused in a downstream step, either alone or in admixture with the process water from that downstream step that the impurities in the first step react deleteriously with performance of the downstream step.

Thus, in its broadest aspect the present invention comprises the separate treatment and recycling of the process water resulting from the first step inorganic-organic classification for reuse in the inorganic-organic classification step; the separate treatment and recycling of the process water resulting from the second step of size classification for reuse in either the first or the second step; and, the separate treatment and recycling of the process water resulting from the third step froth flotation for reuse in any of the three steps of the process.

Treatment for the process water discharged from the first step can be limited to straining to remove entrained particles and other debris prior to reuse of the water in the first step. Treatment for the process water discharged from size classification procedures of the second step or either or both of the comminution or size classification procedures in the preferred second step embodiment, prior to reuse of the water in either the first or second step, can be limited to settling, preferably with the addition of alum and/or a flocculant in a thickener. Treatment for the water discharged from froth flotation prior to reuse can be by screening to separate undesirable floating material and addition of alum (aluminum potassium sulfate) and lime (calcium oxide) in a thickener.

As such, another aspect of the present invention is a method for treating the water discharged from each of the several steps of a process for recovering glass from municipal waste comprising the steps of treating the water discharged from the inorganic-organic material separator by screening to remove deleterious debris and then reintroducing the water to the separator; treating the water discharged from the size classification step in a thickener with the assistance of alum and a flocculant and then reintroducing the treated water to either of the first two steps of the process; and, treating the water discharged from froth flotation by first screening and then processing in a thickener with the assistance of alum and lime and then reintroducing the treated water to any part of the glass recovery process.

DRAWING

FIG. 1 is a schematic flow diagram illustrating the present invention in a glass recovery from municipal waste process.

DETAILED DESCRIPTION

As shown in FIG. 1, a glass recovery from municipal waste process 10 comprises three basic steps: a first classification step A to separate organic materials from inorganic materials, a second step B of comminution and size classification to obtain a preselected size range from the predominantly glass inorganics, and a froth flotation step C to separate the glass from the remaining inorganic tailings.

The input to the first classification A is itself the product of several prior classifications (not shown) and may comprise a glass-containing predominantly organic fraction and a glass-containing predominantly inorganic fraction or either of them. The organic constitutents of the predominantly organic fraction may include, in addition to glass, cellulosic materials such as paper, tree trimmings, and vegetables, etc., plastics, rubber stock and animal wastes, etc. The inorganic constituents of the predominantly inorganic fraction may include, in addition to glass, concrete, brick, and metals, etc.

Typical of the glasses to be recovered are common bottle or container glass, window or plate glass and incandescent lamp bulbs; these are generally classified as soda-lime glasses. A typical analysis of a soda-lime glass would comprise from about 70 to about 73 percent by weight silicon dioxide, from about 11 to about 18 percent by weight sodium oxide, from about 7 to about 17 percent by weight calcium oxide, the remainder being essentially other metal oxides such as colorants and the like.

The inorganic-organic classification A may be carried out in any water based apparatus capable of effectively separating organic material from inorganic material. Examples of such apparatus include jig concentrators, spiral classifiers and rake classifiers; the preferred apparatus are jig concentrator and spiral classifier. In the spiral classifier 12 shown, water recycled according to the instant invention enters the apparatus at 14 in the top one-third thereof, and exits at 16 with the organic materials entrained in the overflow. The exit water flows to a first recycling means which includes a first separation means such as rotating screen filter 18 or other form of filter to remove the entrained organics before being pumped by pump 20 back to its entry 14 in the spiral classifier. Preferably the screen filter will have a mesh size of from about 10 to about 60 mesh which size has been found to be the most effective in removing deleterious entrained organics.

The main glass stream 22, exits the spiral classifier, and is washed by water recycled from the second classification step B. Glass stream 22 then flows from the inorganic-organic classification A to a second classifier, such as a vibrating screen separator 24 or other apparatus or procedure for making a classification of materials according to a predetermined size. In the exemplary separator 24 the particles in stream 22 are screened to remove particles less than about 20 mesh.

The separator preferably works in concert with a comminutor 26 such as a rod mill to reduce the particle size of the separator overflow and thereby optimize the outflow of the desired, less than 20 mesh, separator underflow. The comminuter may be positioned either downstream (as shown) or upstream from the separator, i.e., may act (as shown) on only those particles above a predetermined size or may act on all particles discharged from the inorganic-organic classification A. Particles which are not susceptable to reduction in the comminutor, usually those having a dimension in excess of ¼ inch are discharged from the separator and used for landfill. Other types of comminution devices such as gyratory crushers, hammer mills, cage mills, cone crushers and roll crushers are applicable to this preferred mode of the process. As used herein, the term "comminution" means any physical act of size reduction. A rod mill is the preferred apparatus because of its ability to reduce friable or brittle materials, including large glass particles, which pass through the subsequent screening operation, while the more ductile materials, such as metals, are flattened for discharge out of the system at low cost and with little critical wear.

The separator under size 28 is discharged to a third size classifier 30 which may also, as shown, be a spiral classifier or any other water based apparatus or process which can distinguish between materials on the basis of a predetermined size. The third size classifier eliminates particles which are too small for efficient froth flotation; generally these particles are less than about 325 mesh. Recycled water from this step B of the process enters the spiral classifier 30 at a point in the top one-third thereof and exits at 34 with the less than 325 mesh "slimes."

The process water and entrained slimes from the third size classifier flow to a second recycling means, which includes second separation means, preferably a separator such as thickener 36 for purification and clarification prior to reuse in this or the first step of the glass recovery process. In the illustrated thickener 36 the recycled water is preferably treated with beneficial amounts of a coagulant such as aluminum potassium sulfate commonly called alum, and a nonionic, anionic or cationic flocculant to settle out the desired less than 325 mesh slimes. Other well known devices and procedures for separating or settling fine, suspended particles from the suspending water, such as hydroclassifiers and lamella thickeners are equally applicable for this step of the instant process. The thus treated water can then be recycled through pipe 39 for use in this or the first step of the process without any deleterious affects on the process.

The oversize effluent stream from the top of the third sizing classifier 30 which contains the desired 20–325 mesh particles is washed by recycled water from step C of the process into an agitated conditioner tank 32. A beneficiating amount of collector reagent, with or without conventional frothing agents and/or extenders are added to the conditioner tank. The comminuted mass of inorganic matter mixed with the particulate glass in conditioner tank 32 consists essentially of materials which are substantially non-responsive to the beneficiating action of the collector reagent. Typically, the beneficating collector reagent is an amine or a mixture of amines which, for economy reasons may be extended using conventional hydrocarbons such as kerosene, mineral oil and fuel oil, etc.

Examples of amines include tallowamine acetate; N-hexadecylamine acetate; N-octadecylamine acetate; laurylamine acetate; primary amines derived from cocoa fatty acids, tallow fatty acids, soya fatty acids, castor fatty acids, oleylamine acetate; dihydroabietyl amine, primary tallow amine hydrochlorides, cottonseed oil amine hydrochlorides, N-oleyl-1,3-propylene diamine; N-tall oil-1,3-propylene diamine; N-tallow oil-1,3-propylene diamine and the like. Examples of frothing agents include pine oil, methyl isobuytyl carbinol, and methyl glycol ether.

The conditioned glass-containing inorganic product of conditioner tank 32 is pumped to a series of froth flotation cells 35 and air is blown into the cells to form the froth. The purified glass stream floats in the froth and flows out the top of flotation cells 35; the inorganic tailing sink to the bottom and are removed. After subsequent defoaming (not shown) the purified glass is separated from the water on third recycling means which includes third separation means such as a filter or screen 37.

The used water from the screen 37 flows into a fourth separation means such as thickener tank 38 having an agitator 40 for purification and clarification prior to being pumped through pipe 42 for reuse in any of the steps of the glass recovery process. Preferably a beneficial amount of a clarifying reagent such as ferric chloride, sulfuric acid, alum and lime are added and, in combination with the agitator, they settle out any remaining impurities which would be deleterious to the process. The purified water flows out the top of tank 38 for reuse and the impurities are drawn off at the bottom of the tank. As with the purification/clarification of recycled water in the size classification/comminution step of the instant glass recovery system any known means such as hydroclassifier and lamella thickener can be used to separate suspended particles from the entraining water so as to make it suitable for reuse in this step of the process.

Since this invention may be embodied in several forms without departing from the spirit or essential character thereof, the present embodiment is illustrative and not restrictive. The scope of the invention is defined by the appended claims rather than by the description preceding them, and all embodiments which fall within the meaning and range of equivalency of the claims are, therefore, intended to be embraced by those claims.

We claim:

1. A process for the recovery of glass from the municipal trash which has been segregated into a glass-containing organic fraction and a glass-containing inorganic fraction comprising the steps of:

(a) introducing the glass-containing organic fraction and the glass-containing inorganic fraction to a first water-based classifier, introducing water to the first classifier to entrain and separate the organic materials from the inorganic materials and leave a glass-containing inorganic mixture, discharging the water with the entrained organic materials to a first recycling means which includes first separation means to separate the entrained organic materials from the water, and thereafter recycling at least a portion of the water back to the first classifier;

(b) discharging the glass-containing inorganic mixture from the first classifier, entraining the glass-containing inorganic mixture in a stream of water, transferring the glass-containing inorganic mixture and entraining water to a second classifier to remove particles greater than a first predetermined mesh size, passing the entraining water and particles less than the predetermined mesh size to a third classifier to remove particles less than a second predetermined mesh size and recovering a size classified glass-containing inorganic mixture, discharging the entraining water and particles less than the second predetermined mesh size to a second recycling means which includes second separation to separate the water from the particles, and thereafter recycling at least a portion of the water from the second recycling means to entrain the glass-containing inorganic mixture discharged from the first classifier and transfer it to the second classifier; and, (c) subjecting the size classified glass-containing inorganic mixture recovered from the third classifier to froth flotation in water in the presence of a beneficiating amount of a collector reagent for glass to form a water float containing predominantly glass and an essentially glass-free tailing, discharging the glass and entraining water to a third recycling means which includes third separation means to separate the major portion of the glass from the entraining water, said entraining water from said third separation means having suspended entrained particles, and fourth separation means to separate suspended, entrained particles from the water discharged from said third separation means and thereafter recycling a portion of the water from the third recycling means for use in the froth flotation and recycling a portion of the water to any one, two or all of the first, second and third classifiers, such process being further characterized in that none of the water recycled from any individual recycling means is returned to the process at a point downstream from such recycling means.

2. A process for the recovery of glass according to claim 1 wherein the first recycling means includes a screen separation means.

3. A process for the recovery of glass according to claim 1 further comprising the steps of comminuting the particles greater than the first predetermined mesh size discharged from the second classifier and thereafter passing the said particles back to the second classifier.

4. A process for the recovery of glass according to claim 1 wherein the second classifier is a plurality of screens.

5. A process for the recovery of glass according to claim 1 further comprising the step of adding a beneficial amount of a coagulant and a flocculant to the separation means of the second recycling means.

6. A process for the recovery of glass according to claim 1 further comprising the step of recycling at least a portion of the water from the second recycling means to the third classifier.

7. A process for recovering glass according to claim 1 further comprising the step of adding a beneficial amount of at least one clarifying reagent to the separation means of the third recycling means.

8. A process for recovering glass according to claim 7 wherein the clarifying reagents are selected from the group consisting of ferric chloride, sulfuric acid, alum and lime.

9. A process for recovering glass according to claim 1 wherein the size classified glass-containing inorganic mixture discharged from the third classifier is mixed with the collector reagent in a mixer means prior to froth flotation.

10. A process for recovering glass according to claim 9 further comprising the step of entraining the size classified glass containing inorganic mixture discharged from the third classifier with at least a portion of the water discharged from the second separating means prior to introduction of said inorganic mixture to the mixer.

11. A process according to claim 1 wherein at least a portion of the water recycled from the second recycling means is introduced to the first classifier.

12. A process according to claim 1 wherein at least a portion of the water recycled from the third recycling means is introduced to the first classifier.

13. A process according to claim 1 wherein at least a portion of the water recycled from the third recycling means is introduced to the second classifier.

14. A process according to claim 1 wherein at least a portion of the water from the third recycling means is introduced to the third classifier.

15. A process according to claim 1 further comprising the step of comminuting the particles discharged from the first classifier prior to their introduction to the second classifier.

16. A process for the recovery of glass from municipal trash containing organic constituents and inorganic constituents in addition to glass comprising the steps of:

(a) introducing the trash to a first water-based classifier, introducing water to the first classifier to entrain and separate the organic constituents from the glass and other inorganic constituents, discharging the water with the entrained organic constituents to a first recycling means which includes first separation means to separate the entrained organic constituents from the water and thereafter recycling at least a portion of the of the water back to the first classifier;

(b) discharging the glass and other inorganic constituents from the first classifier and entraining them with water, introducing them to classifying means to obtain a preselected size distribution of the glass and other inorganic constituents by separating out particles therefrom greater than a predetermined mesh size and particles less than the preselected mesh size, discharging the entraining water and particles less than the preselected size to a second recycling means which includes second separation means to separate the water from the particles and thereafter recycling at least a portion of the water from the second recycling means for use in entraining the glass and other inorganic constituents discharged from the first classifier; and, (c) subjecting the preselected size distribution of glass and other inorganic constituents to froth flotation in water in the presence of a beneficiating amount of a collector reagent for glass to separate the glass from the other inorganic constituents, discharging the glass and entraining water to a third recycling means which includes third separation means to separate the major portion of the glass from the entraining water, said entraining water from said third separation means having suspended, entrained particles, and fourth separation means to separate entrained, suspended particles from the water discharged from said third separation means and thereafter recycling at least a portion of the water from the third recycling means for use in the froth flotation, such process being further characterized in that none of the water recycled from any individual recycling means is returned to the process at a point downstream from such recycling means.

17. A process according to claim 16 wherein at least a portion of the water recycled from the second recycling means is introduced to the first classifier.

18. A process according to claim 16 wherein at least a portion of the water recycled from the third recycling means is introduced to the first classifier.

19. A process according to claim 16 wherein at least a portion of the water recycled from the third recycling means is introduced to said classifying means.

20. A process according to claim 16 wherein at least a portion of the water from the third recycling means is introduced to the classifying means, which comprises a second and a third classifier.

21. A process for the recovery of glass according to claim 16 further comprising to step of recycling at least a portion of the water from the second recycling means to the classifying means, which comprises a second and a third classifier.

22. A process for the recovery of glass according to claim 16 further comprising the steps of comminuting the particles greater than the first predetermined mesh size discharged from the classifying means and thereafter passing the said particles back to the classifying means.

23. A process according to claim 16 further comprising the step of comminuting the particles discharged from the first classifier prior to their introduction to the second classifier.

* * * * *

UNITED STATES PATENT AND TRADEMARK OFFICE
CERTIFICATE OF CORRECTION

PATENT NO. : 4,276,155

DATED : June 30, 1981

INVENTOR(S) : John G. Roeschlaub et al

It is certified that error appears in the above-identified patent and that said Letters Patent are hereby corrected as shown below:

Column 4, line 21, "desired" should read --undesired--.

Column 5, line 54, after "separation" and before "to" insert---means---

Signed and Sealed this

*Eighth* Day of *September 1981*

[SEAL]

*Attest:*

GERALD J. MOSSINGHOFF

*Attesting Officer* *Commissioner of Patents and Trademarks*